(12) United States Patent
Beddoe et al.

(10) Patent No.: US 7,793,338 B1
(45) Date of Patent: Sep. 7, 2010

(54) SYSTEM AND METHOD OF NETWORK ENDPOINT SECURITY

(75) Inventors: Marshall A. Beddoe, Laguna Niguel, CA (US); Stuart C. McClure, Ladera Ranch, CA (US)

(73) Assignee: McAfee, Inc., Santa Clara, CA (US)

( * ) Notice: Subject to any disclaimer, the term of this patent is extended or adjusted under 35 U.S.C. 154(b) by 1690 days.

(21) Appl. No.: 10/970,033

(22) Filed: Oct. 21, 2004

(51) Int. Cl.
*G06F 17/30* (2006.01)
(52) U.S. Cl. ............... 726/3; 726/22; 726/23
(58) Field of Classification Search ............ 726/3, 726/22–23
See application file for complete search history.

(56) References Cited

U.S. PATENT DOCUMENTS

| | | | |
|---|---|---|---|
| 6,266,774 B1 | 7/2001 | Sampath et al. | 713/201 |
| 6,282,546 B1 | 8/2001 | Gleichauf et al. | 707/102 |
| 6,301,668 B1 | 10/2001 | Gleichauf et al. | 713/201 |
| 6,324,656 B1 | 11/2001 | Gleichauf et al. | 714/37 |
| 6,725,377 B1 * | 4/2004 | Kouznetsov | 726/23 |
| 6,952,779 B1 * | 10/2005 | Cohen et al. | 726/22 |
| 7,000,247 B2 | 2/2006 | Banzhof | 726/2 |
| 7,055,173 B1 * | 5/2006 | Chaganty et al. | 726/11 |
| 7,089,590 B2 * | 8/2006 | Judge et al. | 726/22 |
| 7,155,487 B2 * | 12/2006 | Yau et al. | 709/213 |
| 7,249,187 B2 * | 7/2007 | Sobel et al. | 709/229 |
| 7,353,390 B2 * | 4/2008 | Chandley et al. | 713/168 |
| 2001/0034847 A1 | 10/2001 | Gaul, Jr. | 713/201 |
| 2003/0065773 A1 * | 4/2003 | Aiba et al. | 709/224 |
| 2003/0105973 A1 * | 6/2003 | Liang et al. | 713/200 |
| 2003/0177389 A1 * | 9/2003 | Albert et al. | 713/201 |
| 2003/0188194 A1 * | 10/2003 | Currie et al. | 713/201 |
| 2003/0195861 A1 * | 10/2003 | McClure et al. | 707/1 |
| 2003/0217039 A1 | 11/2003 | Kurtz et al. | 707/1 |
| 2004/0107274 A1 * | 6/2004 | Mastrianni et al. | 709/223 |
| 2005/0097199 A1 * | 5/2005 | Woodard et al. | 709/223 |

(Continued)

FOREIGN PATENT DOCUMENTS

WO    WO 03/060717    7/2003

OTHER PUBLICATIONS

Hassell (Jonathan Hassell, "Deploying Network Access Quarantine Control, Part 1", Sep. 2004).*

(Continued)

*Primary Examiner*—Kambiz Zand
*Assistant Examiner*—Peter Poltorak
(74) *Attorney, Agent, or Firm*—Zilka-Kotab, PC

(57) ABSTRACT

A system and a method enhance endpoint security of a computer network. The system and method generate security assessments of hosts on quarantined and non-quarantined networks. Based on the generated security assessments, secure hosts are connected to the non-quarantined network and non-secure or vulnerable hosts are connected to the quarantined network. A remediation engine assists with fixing vulnerabilities of the hosts on the quarantined network. Endpoint security agents, security scanners, and remediation engines that carry out the foregoing functions reside on each of the quarantined and non-quarantined networks on hosts that are different from the target hosts. Under such an architecture, the endpoint security system can advantageously be operating system agnostic and can provide complete and powerful endpoint security for targeted hosts without being installed on each individual targeted host. Alternatively, endpoint security agents, security scanners, and remediation agents can reside partially or wholly on one or more target hosts.

22 Claims, 5 Drawing Sheets

U.S. PATENT DOCUMENTS

2005/0267954 A1* 12/2005 Lewis et al. ................. 709/221
2005/0273853 A1* 12/2005 Oba et al. .................... 726/22
2006/0085852 A1*  4/2006 Sima ........................... 726/22
2006/0101518 A1*  5/2006 Schumaker et al. ........... 726/25

OTHER PUBLICATIONS

Posey (Brien M. Posey, Windows Network Access Protection (NAP) simplifies Quarantine Mode, Sep. 2004).*

Shinder (Deb Shinder, "Server 2003's Network Access Quarantine Control: What is it and How Does it Enhance Security?", May 2004).*

Murphy, "Microsoft-Cisco Deal Remodels Endpoint Security Landscape"Datamonitor ComputerWire; Oct. 19, 2004.

Richmond, "Trend Micro: Cisco Partnership Key to Long-Term Strategy" Dowjones: Oct. 20, 2004.

Droms, "Network Working Groups Request For Comments: 2131" http://www.ietf.org/rfc/rfc2131.txt ; Mar. 1997.

* cited by examiner

SYSTEM AND METHOD OF NETWORK ENDPOINT SECURITY

BACKGROUND OF THE INVENTION

1. Field of the Invention

Embodiments of the invention relate to endpoint security of a computer network.

2. Description of the Related Art

Computer networks can be susceptible to a number of security flaws or vulnerabilities. Such vulnerabilities include, for example, open ports, rogue applications, trojan horses, backdoors, viruses, and worms. If they are not remedied, these vulnerabilities can harm individual computers on a computer network, such as by causing lost or corrupted data or by allowing access to unauthorized users. Additionally, a vulnerability on one computer can damage another computer on the same network. For example, an unauthorized user can sometimes exploit the vulnerability of one computer on a network in order to gain access to other computers on the network, or, in some cases, even to the entire network. Furthermore, many vulnerabilities, such as viruses and worms, tend to spread from one computer to another on a network. In light of the foregoing, the risk that security breaches will occur on a computer network increases as more hosts with security vulnerabilities are connected to the network.

Endpoint security focuses on reducing the risk that non-secure or vulnerable hosts will harm other hosts on a computer network. One way to reduce that risk is to fix vulnerable hosts, such as, for example, by using virus scanners to detect and remove viruses. Another way to reduce that risk is to restrict the access that vulnerable hosts have to other computers on a computer network. A number of tools exist to assist network administrators to maintain endpoint security on a computer network.

SUMMARY OF THE INVENTION

Embodiments of the systems and methods described herein provide more complete and powerful endpoint security tools and solutions than have been available in conventional tools. In one embodiment, an endpoint security system is configured to reside on a quarantined virtual local area network and to manage the connection of a host to either the quarantined virtual local area network or to a non-quarantined virtual local area network based on a security assessment of the added host. In one embodiment, the endpoint security system comprises a security scanner, a dynamic host configuration protocol server, and an endpoint security agent. The security scanner is configured to perform a security assessment on a host. The dynamic host configuration protocol server is configured to assign Internet Protocol addresses to hosts added to the quarantined virtual local area network. The endpoint security agent is configured to extract, from at least one packet sent by the dynamic host configuration protocol server, an Internet Protocol address that has been assigned to a host added to the quarantined virtual local area network, to forward the extracted Internet Protocol address to the security scanner and cause the security scanner to perform a security assessment on the added host, to receive the security assessment, and to cause a switch to connect the added host to the non-quarantined virtual local area network if, based on the security assessment of the added host, the added host is deemed to be a secure host.

In one embodiment, an endpoint security agent is configured to reside on at least a first host on a computer network. In one embodiment, the endpoint security agent comprises a host detection module, a security scan module, and a quarantine module. The host detection module is configured to extract, from network traffic, data sufficient to identify a second host that has been added to the computer network. The security scan module is configured to forward at least a portion of the extracted data to a security scanner and to cause the security scanner to generate a security assessment of the second host. The quarantine module is configured to cause a switch to connect the second host to either a quarantined portion of a network or a non-quarantined portion of a network based at least in part on the security assessment.

According to embodiments, a security assessment generated for a host is based, at least in part, on whether the host is vulnerable to a number of known viruses and on which ports of the host are open. The security assessment can be based, in addition to or in place of the foregoing factors, on other factors. Many such factors are described within the Detailed Description of Preferred Embodiments.

According to embodiments, the quarantined portion of a network comprises a first virtual local area network and the non-quarantined portion of a network comprises a second virtual local area network.

According to embodiments, data sufficient to identify hosts connected to a network comprise a network address. For example, such a network address comprises, in one embodiment, an Internet Protocol address. In one embodiment, the host detection module is configured to extract the data sufficient to identify a host from network traffic that is addressed to the host upon which the host detection module resides. Alternatively or additionally, the host detection module can be configured to extract such identifying data from network traffic that is broadcast on the network upon which the host detection module resides.

According to embodiments, the quarantine module is further configured to cause a switch to connect a host to a non-quarantined portion of a network if, based on at least a portion of the security assessment, the host is deemed to be a secure host.

In one embodiment, an endpoint security system is configured to be connected to a quarantined portion of a network. Such an endpoint security system comprises a security scanner, an endpoint security agent, and a remediation engine. The security scanner is configured to generate a security assessment of a first host. The endpoint security agent is configured to reside in at least a second host, to extract, from network traffic on the quarantined portion of a network, data sufficient to identify a host added to the quarantined portion of a network, to forward the extracted data sufficient to identify the added host to the security scanner and cause the security scanner to perform a security assessment on the added host, to receive the security assessment, and to cause a switch to connect the added host to a non-quarantined portion of a network if, based on the security assessment of the added host, the added host is deemed to be a secure host. The remediation engine is configured to help fix at least one security vulnerability found on a host that has been deemed to be a vulnerable host.

According to embodiments, the security scanner is further configured to periodically generate a follow-up security assessment of a quarantined host. Additionally, the endpoint security agent is further configured to receive each follow-up security assessment and to cause a switch to connect the quarantined host to a non-quarantined portion of a network if, based on at least one follow-up security assessment, the quarantined host is deemed to be a secure host.

According to embodiments, the remediation engine is configured to help fix at least one vulnerability of a vulnerable host by accessing the vulnerable host and executing an application that points a user to at least one resource for fixing the at least one vulnerability. The application can comprise a web browser. The resource can comprise a patch management system.

According to embodiments, the remediation engine is configured to help fix at least one vulnerability of a vulnerable host by causing a web browser launched by a user on the vulnerable host to be redirected to at least one resource for fixing the at least one vulnerability. The resource can comprise a patch management system.

In one embodiment, an endpoint security system is configured to be connected to a non-quarantined portion of a network. The endpoint security system comprises a security scanner and an endpoint security agent. The security scanner is configured to generate a security assessment of a first host connected to the non-quarantined portion of a network. The endpoint security agent is configured to reside on at least a second host, to receive the security assessment of the first host, and to cause a switch to connect the first host to a quarantined portion of a network if, based on at least a portion of the security assessment, the first host is deemed to be a vulnerable host.

In one embodiment, an endpoint security system comprises a first security scanner, a first endpoint security agent, a second security scanner, and a second endpoint security agent. The first security scanner is configured to generate a security assessment of a first host connected to a quarantined portion of a network. The first endpoint security agent is configured to reside on at least a second host connected to the quarantined portion of a network and to cause a switch to connect the first host to a non-quarantined portion of a network if, based on at least a portion of the security assessment of the first host, the first host is deemed to be a secure host. The second security scanner is configured to generate a security assessment of a third host connected to the non-quarantined portion of a network. The second endpoint security agent is configured to reside on at least a fourth host connected to the non-quarantined portion of a network and to cause a switch to connect the third host to the quarantined portion of a network if, based on at least a portion of the security assessment of the third host, the third host is deemed to be a vulnerable host.

In one embodiment, a method of providing endpoint security of a computer network comprises detecting a connection of a host that has been added to a quarantined portion of a computer network, directing a security assessment to be generated on the added host, receiving the security assessment, and directing connection of the added host to a non-quarantined portion of a computer network if, based on at least a portion of the security assessment, the added host is deemed to be a secure host.

In one embodiment, a method of providing endpoint security of a computer network comprises receiving, by an endpoint security agent residing in a first host connected to a quarantined portion of a network, a security assessment that has been generated for a second host and directing connection of the second host to a non-quarantined portion of a network if, based on at least a portion of the security assessment, the second host is deemed to be a secure host. In one embodiment, the second host is initially connected to the quarantined portion of a network.

Embodiments of the foregoing methods further comprise directing connection of the second host to the quarantined portion of a network if, based on at least a portion of the security assessment, the second host is deemed to be a vulnerable host. Directing connection of the second host to the quarantined portion of a network can comprise leaving the second host connected to the quarantined portion of a network if the second host is already connected to the quarantined portion of a network.

Embodiments of the foregoing methods further comprise managing remediation of at least one vulnerability of the second host.

Embodiments of the foregoing methods further comprise periodically receiving a follow-up security assessment of the second host that has been connected to the quarantined portion of a computer network and connecting the second host to the non-quarantined portion of a network if, based on at least one follow-up security assessment, the second host is deemed to be a secure host.

Embodiments of the foregoing methods further comprise directing the generation of the security assessment of the second host.

Embodiments of the foregoing methods further comprise detecting the second host upon connection of the second host to the quarantined portion of the network. Detecting the second host can comprise extracting, from network traffic, data sufficient to identify the second host.

In one embodiment, a method of providing endpoint security on a computer network comprises generating, by a security engine residing on at least a first host connected to a non-quarantined portion of a network, a security assessment of a second host connected to the non-quarantined portion of a network, and directing connection of the second host to a quarantined portion of a network if, based at least on a portion of the security assessment, the second host is deemed to be a vulnerable host. In one embodiment of the foregoing method, the generation of a security assessment of the second host is performed periodically.

A skilled artisan will appreciate, in light of this disclosure, that the foregoing and other embodiments of the systems and methods described herein provide a number of features that are novel and advantageous compared to conventional endpoint security tools. While the foregoing summary is indicative of a number of novel and advantageous embodiments, the invention is not limited to the foregoing embodiments. Indeed, many additional novel and advantageous embodiments are disclosed or apparent to a skilled artisan in light of the disclosure.

DETAILED DESCRIPTION OF PREFERRED EMBODIMENTS

Figure 1:
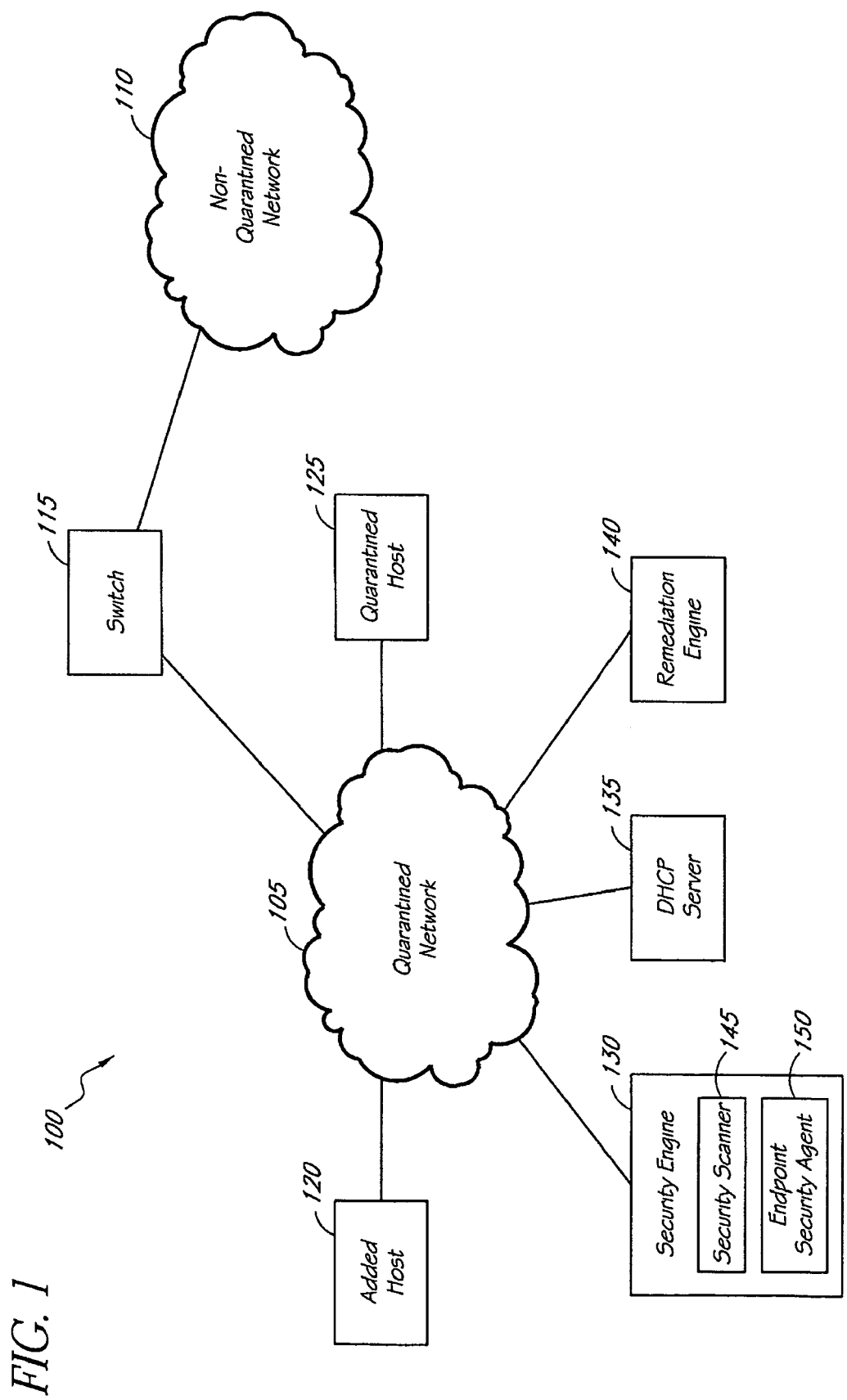
FIG. 1 is a block diagram that illustrates a quarantined computer network with a connected endpoint security system according to one embodiment.

Computer network security administrators are typically responsible for protecting a computer network from attacks from hostile computer users, viruses, trojan horses, and other human and non-human network attackers. Network attackers, whether human or not, attempt to exploit vulnerabilities in the hosts of a computer network. Such vulnerabilities can include open ports, installed applications such as email programs that have known security flaws, or backdoors. By successfully exploiting a vulnerability in one host connected to a computer network, an attacker can generally access and potentially damage the vulnerable host. Furthermore, at times an attacker can exploit a vulnerability in a single host on a network to gain access to other hosts on the same computer network. Thus, a vulnerability on one host on a computer network can potentially adversely affect the security of an entire computer network.

As such, computer network security administrators may desire to isolate vulnerable hosts from the rest of a computer network such that the vulnerable hosts cannot be exploited to gain access to or otherwise damage additional hosts on the computer network. Accordingly, a network security administrator can connect the vulnerable hosts to one computer network and connect the non-vulnerable hosts to a separate computer network. As used herein, a computer network to which vulnerable hosts are connected is a "quarantined network," and a computer network to which non-vulnerable hosts are connected is a "non-quarantined network." A network security administrator can configure a quarantined network such that the connected vulnerable hosts have access only to other hosts that are also connected to the quarantined network. Similarly, a network security administrator can configure a non-quarantined network such that the connected non-vulnerable hosts do not have access to the vulnerable hosts connected to the quarantined network. Accordingly, in this configuration, the vulnerabilities of the vulnerable hosts do not enable an attacker to gain access to or otherwise damage the non-vulnerable hosts of the non-quarantined network.

A network administrator can use the foregoing configuration to protect an organization's most critical applications and services from security attacks. A network administrator can install critical applications and services on a host connected to a non-quarantined network. By connecting vulnerable hosts to a quarantined network, the network administrator prevents the vulnerable hosts from accessing or corrupting the critical applications and services. While connecting vulnerable hosts to a quarantined network provides increased security for critical applications and services on a non-quarantined network, network administrators typically desire to have most hosts connected to a non-quarantined network most of the time. In many cases, a computer network can achieve maximum productivity only if a large number of hosts are able to access at least some of the most critical applications and services. Hosts connected to a quarantined network, however, cannot access or be accessed by non-quarantined hosts, and therefore cannot use the critical applications and services. As a result, quarantined hosts are typically less useful and productive than non-quarantined hosts. As such, network administrators typically desire to quickly diagnose and fix the vulnerabilities of the hosts on a quarantined network such that the hosts can quickly be moved from the quarantined network to the non-quarantined network.

Advantageously, embodiments of the system and method described herein provide an automated mechanism for connecting vulnerable hosts to a quarantined network and connecting non-vulnerable hosts to a non-quarantined network. Furthermore, embodiments described herein provide mechanisms for managing the remediation of security vulnerabilities that cause a host to be vulnerable. Advantageously, such mechanisms assist a computer network administrator to fix vulnerable hosts more quickly such that the fixed hosts can more quickly and safely be connected to the non-quarantined network. Additionally, certain embodiments described herein provide mechanisms for periodically assessing hosts on the non-quarantined network to determine if those hosts have become vulnerable hosts. In these certain embodiments, any hosts on the non-quarantined network that have become vulnerable are disconnected from the non-quarantined network and connected to the quarantined network until remedial steps are taken to fix the hosts' vulnerabilities.

Advantageously, embodiments described herein comprise an endpoint security agent that determines, based on assessed security levels, whether one or more hosts will be connected to a quarantined network or to a non-quarantined network. Advantageously, according to embodiments, the endpoint security agent need not be installed on the host or hosts for which the endpoint security agent is making this determination. Accordingly, embodiments of the endpoint security agent can be centrally located in one or a limited number of hosts but still provide endpoint security for a large number of hosts. Consequently, embodiments of the endpoint security agent need not be installed on every host that is added to a computer network. Additionally, embodiments of the endpoint security agent are operating system agnostic, meaning that they can provide endpoint security for hosts running a variety of operating systems, without requiring a different endpoint security agent for each operating system. The foregoing and other features of embodiments of the endpoint security agent disclosed herein lead to simplified deployment, upgrade, and maintenance of endpoint security agents. Simplified deployment, upgrade, and maintenance of endpoint security agents promote a uniform application of endpoint security standards by minimizing the likelihood that different versions of endpoint security agents will be installed on different hosts of a network.

Various embodiments of the invention are described below with reference to the drawings. The drawings and the associated descriptions are provided to illustrate embodiments of the invention and not to limit the scope of the invention. Throughout the drawings, certain reference numbers are re-used to indicate correspondence between referenced elements. In addition, the first digit of each reference number indicates the figure in which the element first appears.

FIG. 1 is a block diagram that illustrates a quarantined computer network with a connected endpoint security system according to one embodiment. In one embodiment, the computer network 100 comprises a quarantined network 105, a non-quarantined network 110, and a switch 115. The switch 115 connects to both the quarantined network 105 and the non-quarantined network 110. The switch 115 defines which hosts on the overall network 100 constitute the quarantined network 105 and which hosts constitute the non-quarantined network 110. Additionally, the switch 115 manages the transmission of data from a first node to a second node where either the first node or the second node, or both, are connected to the quarantined network 105 or the non-quarantined network 110. In one advantageous embodiment, the switch 115 is configured to prevent any host connected to the quarantined network 105 from accessing any host connected to the non-quarantined network 110 and to prevent any host connected to the non-quarantined network 110 from accessing any host connected to the quarantined network 105. Advantageously, such a configuration prevents attacks directed at quarantined hosts (hosts connected to the quarantined network 105), which are deemed to have security flaws, from compromising the security of the non-quarantined network 110. In one embodiment, the switch 115 defines a Virtual Local Area Network ("VLAN") that comprises the hosts of the quarantined network 105 and defines a separate VLAN that comprises the hosts of the non-quarantined network 110.

A skilled artisan will appreciate, in light of this disclosure, that many switch implementations exist that can perform the foregoing functions of the switch 115. Existing switch implementations include for example, Layer 2 switches, Layer 3 switches, switches implemented exclusively in hardware, switches implemented as some combination of hardware, software, and firmware, and the like. Additionally, a skilled artisan will appreciate, in light of this disclosure, that certain switches perform the functions of the switch 115 in combination with other devices, software components, or firmware components, such as, for example, routers and databases. As used herein, the term "switch" is a broad term that encompasses its broadest meaning in the context of computer networking and specifically encompasses any device known or that becomes known to a skilled artisan that is configured, either by itself or in combination with one or more devices, software components, or firmware components, to perform the foregoing functions of the switch 115.

In one embodiment, the quarantined network 105 comprises an added host 120 (a host that has recently been added to the network 100), a quarantined host 125, a security engine 130, a Dynamic Host Configuration Protocol ("DHCP") server 135, and a remediation engine 140. In one embodiment, the security engine 130 comprises a security scanner 145 and an endpoint security agent 150.

In one embodiment, when any host, such as, for example, the added host 120, is added to the network 100, the added host 120 is added to the quarantined network 105. Advantageously, adding the added host 120 to the quarantined network 105 increases network security by preventing the added host 120 from accessing the non-quarantined network 110 before the security engine 130 has generated a security assessment of the added host 120. Nevertheless, initially connecting the added host 120 to the quarantined network 105 is not required. The added host 120 can be initially connected in any way that allows the security engine 130 to communicate with the added host 120.

In one embodiment, after the added host 120 has been added to the quarantined network 105, the security engine 130 detects the added host 120, generates a security assessment of the added host 120, determines, based on the security assessment, whether the added host 120 should remain connected to the quarantined network 105 or be connected to the non-quarantined network 110, and directs the switch 115 to connect the added host 120 to either the quarantined network 105 or the non-quarantined network 110 in accordance with the foregoing determination. In the event that the security engine 130 determines that the added host 120 has enough vulnerabilities that it must be placed on the quarantined network 105, the security engine 130 can optionally direct the remediation engine 140 to manage one or more remedial measures for fixing one or more security vulnerabilities of the added host 120. Additionally or alternatively, the security engine 130 can direct the remediation engine 140 to manage one or more remedial measures for fixing one or more security vulnerabilities of any other quarantined host such as the quarantined host 125, or the remediation engine 140 can manage such remedial measures without receiving direction from the security engine 130.

The security scanner 145 and the endpoint security agent 150 assist the security engine 130 to perform the foregoing functions. A more detailed description of the operation of the endpoint security agent 150, according to one embodiment, is provided hereinafter.

Figure 2:
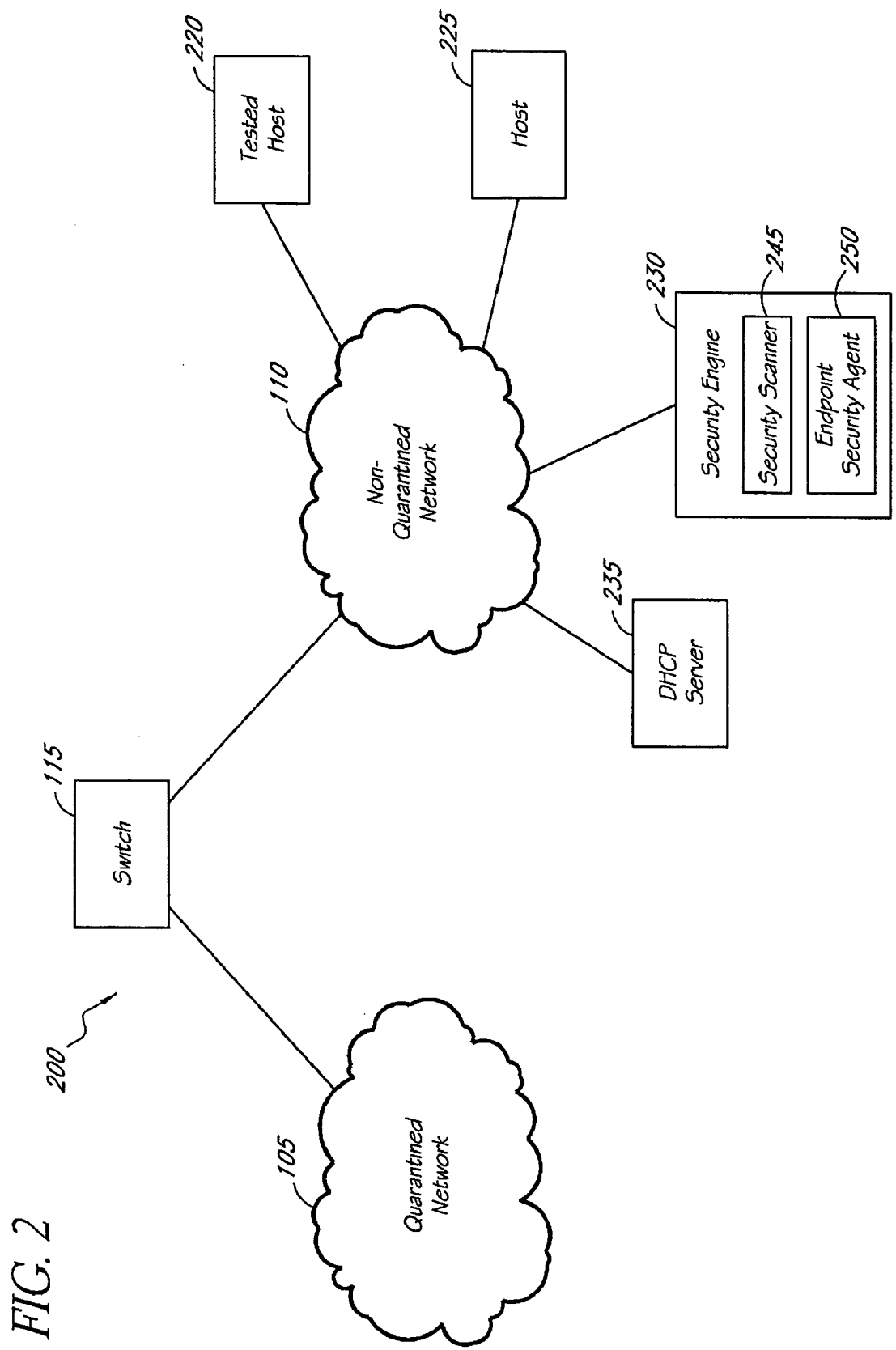
FIG. 2 is a block diagram that illustrates a non-quarantined computer network with a connected endpoint security system according to one embodiment.

FIG. 2 is a block diagram that illustrates a non-quarantined computer network with a connected endpoint security system according to one embodiment. As illustrated, a computer network 200 comprises a quarantined network 105 and a non-quarantined network 110. The quarantined network 105 and the non-quarantined network 110 are connected by a switch 115. The non-quarantined network 110 comprises a number of hosts, including a "tested" host 220, a host 225, a security engine 230, and a DHCP server 235. Note that, in one embodiment, the security engine 230 and the DHCP server 235 are different from the security engine 130 and the DHCP server 135 of the quarantined network 105 of FIG. 1, and therefore have different reference numerals for clarity. The security engine 230 comprises a security scanner 245 and an endpoint security agent 250, both of which are, in one embodiment, different from the security scanner 145 and the endpoint security agent 150 of the quarantined network 105 of FIG. 1. For ease of reference, the host 220 is referred to as the tested host 220 because it is used as an example of a host that undergoes periodic security testing that is performed by the security scanner 245.

A more detailed explanation of the components depicted in FIG. 2 is provided below. First, however, a detailed description of the operation of the endpoint security agent 150, according to one embodiment, is provided with reference to FIG. 3.

Figure 3:
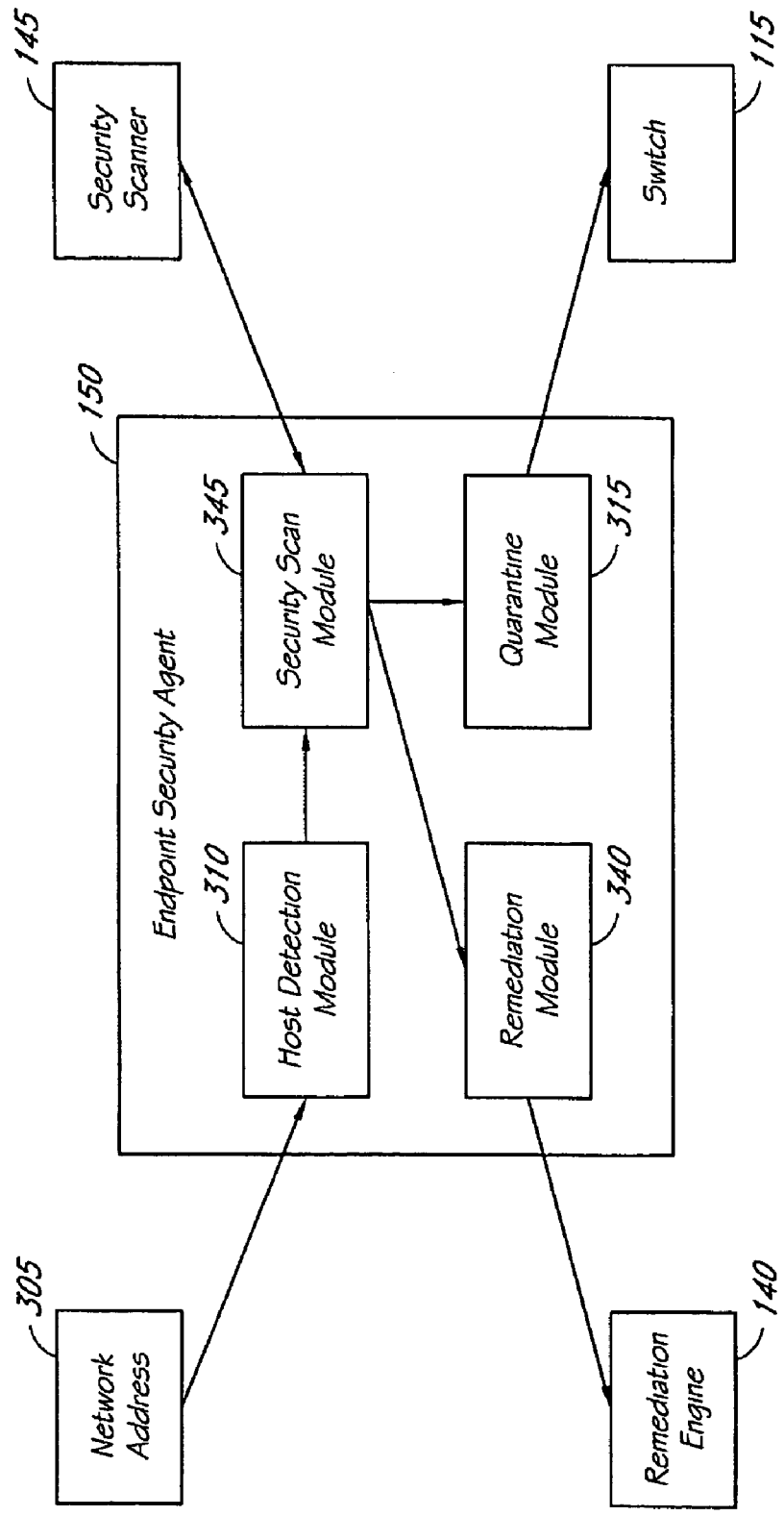
FIG. 3 is a functional block diagram that illustrates some of the operations of one embodiment of an endpoint security agent.

FIG. 3 is a functional block diagram that illustrates some of the operations of one embodiment of an endpoint security agent. In one embodiment, the endpoint security agent 150 comprises a host detection module 310, a security scan module 345, a quarantine module 315, and a remediation module 340. In one embodiment, each of the foregoing modules is implemented in software such that each module comprises a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer to perform one or more specified tasks. The computer-executable instructions can be stored contiguously or non-contiguously and can be stored and executed on a single computer or distributed across multiple computers. Additionally, multiple modules can be combined into a single larger module that performs multiple functions. A skilled artisan will appreciate, in light of this disclosure, how each of the modules can be implemented, in addition to or in place of software, using hardware or firmware. As such, as used herein, each module can be implemented in software, hardware, firmware, or any combination of the foregoing. As with software modules, a skilled artisan will appreciate in light of this disclosure how hardware, firmware, or combination modules can be combined into a fewer number of modules or divided into a larger number of modules and distributed.

Each of the foregoing modules is now described generally. Additionally, particular embodiments of the foregoing modules will be described in greater detail hereinafter. In one embodiment, the host detection module 310 detects the addition of a host, such as the added host 120, to the quarantined network 105. The host detection module 310 further identifies the added host 120 to the security scan module 345, such as, for example, by providing the security scan module 345 with the network address of the added host 120.

The security scan module 345 invokes a security scanner 145, which scans the added host 120 and generates a security assessment of the added host 120. In one embodiment, the security scan module 345 receives the security assessment from the security scanner 145 and provides the quarantine module 315 with the security assessment. In one embodiment, the security scan module 345 also provides the security assessment to the remediation module 340.

In one embodiment, the quarantine module 315 uses the security assessment to determine whether the added host 120 should remain connected to the quarantined network 105 or should be connected to the non-quarantined network 110. Based on this determination, the quarantine module 315 further directs the switch 115 to connect (or leave connected) the added host 120 to the appropriate network.

In one embodiment, the remediation module 340, based on the security assessment, directs the remediation engine 140 to perform remedial actions to fix the added host 120.

In one embodiment, the host detection module 310 detects the added host 120 by receiving a network address 305 of the added host 120. In one embodiment, the host detection module 310 receives the network address 305 in a packet addressed to the host upon which the host detection module 310 resides. In another embodiment, the host detection module 310 receives the network address 305 in a packet that is not addressed to the host upon which the host detection module 310 resides. In one embodiment, the host detection module 310 "sniffs" packets that are broadcast on the quarantined network 105, detects a packet that has the relevant network address 305, and extracts the network address 305 from the relevant packet. A skilled artisan will appreciate, in light of this disclosure, how such "packet sniffing" can be done. Alternatively or additionally, the host detection module 310 can receive packets that are sent directly to the security engine 130. In one embodiment in which the network address 305 is extracted from DHCP packets, the security engine 130 is configured to be a first DHCP/BOOTP relay in order to ensure that DHCP packets are sent to the security engine 130. The host detection module 310 can extract the network address 305 from the DHCP packets, and the host can forward the packets in accordance with DHCP. A skilled artisan will appreciate, in light of this disclosure, that other mechanisms for ensuring that the security engine 130 receives the network address 305 can be used. In certain embodiments, the endpoint security agent 150 resides in a different host from the security engine 130 and in such embodiments the foregoing references to the security engine 130 should be taken to mean the host in which the endpoint security agent 150 resides.

A skilled artisan will appreciate, in light of this disclosure, that any packet that has a relevant network address 305 can be used by the host detection module 310 to detect the network address of the added host 120. The invention does not require the use of any particular packet format or type. Nevertheless, one preferred embodiment is now described, by way of example and not limitation, in which certain types of DHCP packets are used for detecting the added host 120. In one embodiment, as illustrated in FIG. 1, the quarantined network 105 has a connected DHCP server 135. Upon being added to a network, the added host 120 generally receives a network address, such as, for example, an Internet Protocol ("IP") address. According to one protocol for assigning IP addresses known as Dynamic Host Configuration Protocol, the DHCP server 135 is responsible for assigning an IP address to the added host 120. The Dynamic Host Configuration Protocol is defined in *Request for Comments* 2131, a standards track document that has been distributed by the Network Working Group since March 1997. *Request for Comments* 2131 is hereby incorporated by reference in its entirety.

A typical successful interaction between the added host 120 and the DHCP server 135 under DHCP is now described. Under DHCP, the added host 120, upon connecting to the quarantined network 105, transmits a DHCPDISCOVER packet. The DHCPDISCOVER packet comprises a request for an available IP address. The DHCP server 135 responds with a DHCPOFFER packet that comprises an available IP address. The added host 120 receives the DHCPOFFER packet and, in response, transmits a DHCPREQUEST packet that comprises a request for a lease to the IP address identified in the DHCPOFFER packet. The DHCP server 135 receives the DHCPOFFER packet and, in response, transmits a DHCPACK packet that acknowledges that the added host 120 has been granted a lease of generally limited duration to the IP address.

A skilled artisan will appreciate that some DHCP interactions do not occur as outlined in the foregoing example. For example, in some cases, after receiving a DHCPREQUEST packet, the requested IP address may no longer be available. In such a case, the DHCP server 135 responds with a DCHPNAK packet that indicates to the added host 120 that the IP address has not been assigned. Recognizing, therefore, that not all DHCP traffic represents the assignment of an IP address to the added host 120, in one embodiment the host detection module 310 detects DHCPACK packets because such packets represent a successful interaction in which the added host 120 does receive a lease to an IP address.

As previously indicated, in one embodiment, when the host detection module 310 identifies the network address 305 of the added host 120, the host detection module 310 provides the network address 305 of the added host 120 to the security scan module 345. In one embodiment, the security scan module 345 communicates with the security scanner 145, which, in one embodiment, is a component of the security engine 130. A skilled artisan will appreciate, in light of this disclosure, that the security scanner 145 can alternatively be an external component that is not part of the security engine 130 but that is connected to the security scanner 145 through the quarantined network 105. In one embodiment, the security scanner 145 is a module as previously defined.

In one embodiment, the security scan module 345 provides the network address 305 of the added host 120 to the security scanner 145 and directs the security scanner to generate a security assessment of the added host 120. In one embodiment, the security scanner 145 is configured to perform a number of vulnerability detection operations on one or more hosts on a computer network, such as, for example, the vulnerability detection operations that have been disclosed in one or more of the following patent applications or publications: U.S. patent application Ser. No. 10/050,675 entitled "SYSTEM AND METHOD FOR NETWORK VULNERABILITY DETECTION AND REPORTING," which was filed on Jan. 15, 2002, and which was published as United States Publication No. US 2003-0195861 on Oct. 16, 2003, International Publication No. PCT WO 03/060717 A1 entitled "SYSTEM AND METHOD FOR NETWORK VULNERABILITY DETECTION AND REPORTING," which was published on Jul. 24, 2003, U.S. patent application Ser. No. 10/387,221 entitled "SYSTEM AND METHOD FOR NETWORK VULNERABILITY DETECTION AND REPORTING," which was filed on Mar. 10, 2003, U.S. patent application Ser. No. 10/387,358 entitled "SYSTEM AND METHOD FOR NETWORK VULNERABILITY DETECTION AND REPORTING," which was filed on Mar. 10, 2003 and which was published as United States Publication No. US-2003-0217039-A1 on Nov. 20, 2003, and U.S. patent application Ser. No. 10/387,223 entitled "SYSTEM AND METHOD FOR NETWORK VULNERABILITY DETECTION AND REPORTING," which was filed on Mar. 10, 2003. The foregoing patent applications and publications are hereby incorporated by reference herein in their entirety.

In one embodiment, the security scanner 145 is able to detect any combination of one or more of the following vulnerabilities: open ports, backdoors, trojan horses, viruses, and the like. In one advantageous embodiment, the security scanner 145 has access to a vulnerability database comprising a number of vulnerability definitions that define vulnerabilities in terms of characteristics of hosts that have each vulnerability. Furthermore, in one embodiment, the security scanner 145 is able to detect characteristics of each host, match them against the vulnerability definitions, and determine which hosts have each vulnerability. Preferably, the vulnerability database comprises a large number of vulnerabilities of differing types including, for example, open ports, backdoors, trojan horses, viruses, and the like. Advantageously, providing such a vulnerability database enables the security scanner 145 to generate more comprehensive security assessments that take into account a wider range of vulnerabilities.

In one embodiment, the security scanner 145 is configured to generate a security assessment for each host that separately identifies each vulnerability of the host. For example, in this embodiment, a generated security assessment for a particular Host A can indicate a specific list of ports that are open on Host A, that Host A is vulnerable to a particular virus X, and that Host A has an installed email program that has known security flaws. Advantageously, the security scanner 145 can identify each vulnerability of each host using a code that can be interpreted by another module. Alternatively or additionally, the security scanner 145 can be configured to provide a security assessment for each host that scores the overall security of the host according to a numeric, alphabetic, alphanumeric, or other score. For example, in one embodiment, the security scanner 145 generates a numeric score in the range of 0 to 100, where 100 represents the highest level of overall security and 0 represents the lowest level of overall security. Alternatively or additionally, the security scanner 145 can generate more than one numeric, alphabetic, alphanumeric or other score, where each score represents an aspect of a host's security rather than a host's overall security. For example, in one embodiment the security scanner 145 can provide one score related to open ports, another score related to trojan horses, another score related to rogue applications, and the like.

While preferred factors that contribute to a security assessment generated by the security scanner 145 are disclosed, a skilled artisan will appreciate other factors that can be incorporated into a security assessment. A skilled artisan will further appreciate, in light of this disclosure, that one or more of the listed factors can be omitted from the generation of a security assessment without departing from the invention. Additionally, while certain information included in a security assessment is identified herein, alternative embodiments of the security scanner 145 can generate a security assessment that omits some of the listed information or that adds additional information that is not listed but that will be understood by a skilled artisan in light of this disclosure.

Advantageously, in one embodiment the security scanner 145 can scan a wide variety of hosts regardless of the operating system, application programs, services, network types, and other characteristics of each host. Preferably, the security scanner 145 can scan hosts running commonly used operating systems such as, for example, variants of Windows, variants of Unix, variants of Linux, variants of the Mac OS, variants of OS/2, operating systems that run printers, routers, other devices, and the like. Preferably, the security scanner 145 can be updated to scan hosts running other operating systems or operating system variants as other operating systems or variants are developed. Nevertheless, support for every operating system or an ability to scan every host regardless of the host's characteristics is not required by the invention.

As previously indicated, in one embodiment, the security scanner 145 returns a security assessment for the added host 120 or other scanned host, to the security scan module 345. In one embodiment, the security scan module 345, upon providing the network address 305 to the security scanner 145, periodically polls the security scanner 145 in order to determine whether the security scanner 145 has completed the security assessment. When the security scanner 145 has completed the security assessment, the security scan module 345 requests and receives the security assessment from the security scanner 145. Alternatively or additionally, the security scanner 145 can be configured to send a message that informs the security scan module 345 when the security scanner 145 has completed the security assessment.

In one embodiment, the security scan module 345 provides all or a portion of the security assessment to the quarantine module 315. In one embodiment, the quarantine module 315 determines, based on the security assessment, whether the added host 120 should remain connected to the quarantined network 105 or should be connected to the non-quarantined network 110. In one embodiment, the quarantine module 315 makes this determination according to objective criteria that indicate, based on the security assessment, whether the added host 120 is deemed to be a secure or a vulnerable host. A skilled artisan will appreciate, in light of this disclosure, that a continuum of security levels exists for a group of hosts, and it is rare for any given host to be either completely secure or completely vulnerable. As such, in one embodiment, the quarantine module 315 makes a threshold determination as to whether a host is secure enough to be connected to the non-quarantined network 110. As used herein, therefore, a "secure" host is a host that is deemed, based objectively on the security assessment, to be secure enough to be connected to the non-quarantined network 110. Conversely, as used herein, a "vulnerable" host is a host that is deemed, based objectively on the security assessment, to not be secure enough to be connected to the non-quarantined network 110. In one embodiment, in which the security assessment comprises a numeric score from 0 to 100, where 0 represents complete vulnerability and 100 represents complete security, the quarantine module 315 deems a host to be "secure" if the host has a score of at least 80. A skilled artisan will appreciate, in light of this disclosure, that a different threshold could be chosen, such as, for example, 60, 70, 75, or generally, any score from 0 to 100. In one embodiment, the threshold level can be configured by a user.

Additionally or alternatively, the quarantine module 315 can be configured to deem a host either secure or vulnerable based on a different kind of security assessment. For example, as indicated, the security assessment can, in one embodiment, be a listing of every vulnerability possessed by the scanned host. In this embodiment, the quarantine module 315 can be configured to make a security determination based on a combination of one or more of the individual vulnerabilities possessed by the scanned host. For example, the quarantine module 315 can be configured such that a host that is vulnerable to a virus X, or a worm Y, is automatically deemed to be a vulnerable host, while a host that has port 20 open is not necessarily considered to be a vulnerable host. In one embodiment, the rules under which the quarantine module 315 operates are defined according to boolean algebra or the like. Such boolean algebra rules can be pre-defined or can be configured by a user.

A skilled artisan will appreciate, in light of this disclosure, that the threshold determination of whether a host is secure or vulnerable can be varied according to the specific information provided by the security assessment generated by the security scanner 145. As such, while embodiments of the quarantine module 315 make the threshold determination according to specific described methods, the invention does not require that the quarantine module 315 use any one of the described methods.

According to an embodiment, if the quarantine module 315 deems the added host 120 to be a vulnerable host, the quarantine module 315 acts such that the added host 120 remains or becomes connected to the quarantined network 105. In one embodiment, the added host 120 has already been connected to the quarantined network 105 and the quarantine module 315 does nothing further, but instead simply leaves the added host 120 on the quarantined network 105. Alternatively, the quarantine module 315 directs the switch 115 to connect the added host 120 to the quarantined network 105. One manner in which the switch 115 connects the added host 120 either to the quarantined network 105 or the non-quarantined network 110 is described below.

In one embodiment, if the quarantine module 315 deems the added host 120 to be a secure host, the quarantine module 315 acts such that the added host 120 is connected to the non-quarantined network 110. In one embodiment, the quarantine module 315 directs the switch 115 to connect the added host 120 to the non-quarantined network 110. One manner in which the switch 115 connects the added host 120 either to the quarantined network 105 or the non-quarantined network 110 is now described.

In one embodiment, the switch 115 creates a VLAN for the quarantined network 105 and creates a VLAN for the non-quarantined network 110. Generally, switches maintain tables that indicate, for each host, a VLAN to which the host belongs. By changing entries in such tables, a switch can disconnect a host from one VLAN and connect the host to another VLAN. In one embodiment, the switch 115 is a Layer 2 switch. A Layer 2 switch maintains a table that assigns each host to a VLAN according to the Media Access Control ("MAC") address of the host. A MAC address is a hardware-based address that uniquely identifies each node on a network. Thus, in one embodiment in which the switch 115 is a Layer 2 switch, the quarantine module 315 directs the switch 115 to change its tables such that the MAC address of the added host 120 is associated with the appropriate VLAN that defines either the quarantined network 105 or the non-quarantined network 110.

In one embodiment, the switch 115 is a Layer 3 switch. A Layer 3 switch can maintain either static VLANs or dynamic VLANs. For a static VLAN, a Layer 3 switch maintains a listing of ports where each port is associated with a particular VLAN. In a static VLAN, each host is connected to a particular port that does not change. Thus, by changing its tables, a Layer 3 switch that maintains static VLANs can disconnect one port from one VLAN and connect the port to another VLAN. Because, in static VLANs, each host is connected to a particular port that does not change, the Layer 3 switch can therefore switch a host from one VLAN to another. Thus, in one embodiment in which the switch 115 is a Layer 3 switch that maintains static VLANs, the quarantine module 315 directs the switch 115 to change its tables such that the port to which the added host 120 is connected is associated with the appropriate VLAN that defines either the quarantined network 105 or the non-quarantined network 110. Typically, each switch has a vendor-specific mechanism for receiving instructions to switch a port from one VLAN to another. For example, some switches receive such switch commands using Simple Network Management Protocol ("SNMP"), others use Telnet, and others use web interfaces. Preferably, the quarantine module 315 can be configured to communicate with a wide range of switches. A skilled artisan will appreciate, in light of this disclosure, how to implement a quarantine module 315 that can communicate with any necessary switches.

In one embodiment, the switch 115 is a Layer 3 switch that maintains dynamic VLANs. In a dynamic VLAN, each host is not necessarily always connected to the same port. As such, in a dynamic VLAN, a Layer 3 switch maintains a number of rules that associate the MAC address of each host with a particular VLAN. By changing a rule such that a MAC address is associated with a different VLAN, the Layer 3 switch can disconnect a host from one VLAN and connect the host to another VLAN. Layer 3 switches typically communicate with a separate server that maintains these MAC address to VLAN associations for the switch. One such server type is known as a VLAN Management Policy Server ("VMPS"). Thus, in one embodiment in which the switch 115 is a Layer 3 switch that maintains dynamic VLANs, the quarantine module 315 directs the server that maintains the MAC address to VLAN associations for the switch 115 to change its associations such that the MAC address of the added host 120 is associated with the appropriate VLAN that defines either the quarantined network 105 or the non-quarantined network 110.

While a number of preferred embodiments for maintaining a quarantined network 105 and a non-quarantined network 110 are disclosed above, the invention is not limited to the foregoing disclosed embodiments. A skilled artisan will appreciate, in light of this disclosure, that a number of ways and mechanisms to maintain a quarantined network 105 and a non-quarantined network 110 exist. Furthermore, a skilled artisan will appreciate, in light of this disclosure, how to configure the quarantine module 315 to direct the switch 115 to assign the added host 120 to either the quarantined network 105 or the non-quarantined network 110, as appropriate. The invention is not limited to the disclosed preferred embodiments but encompasses all embodiments disclosed herein or which a skilled artisan would appreciate in light of the disclosure.

In one embodiment, if the added host 120 is deemed to be a vulnerable host, the security scan module 345 also provides the remediation module 340 with the security assessment. Alternatively, the quarantine module 315 can provide the remediation module 340 with the security assessment. In one embodiment, the remediation module 340 communicates with a remediation engine 140 and directs the remediation engine 140 to attempt to fix any security vulnerabilities identified by the security assessment. In one embodiment, the remediation engine 140 is a module as previously defined. The remediation engine 140 can be configured either to automatically fix certain vulnerabilities, to assist a user to fix certain vulnerabilities, or both. Advantageously, providing a remediation engine 140 assists a network administrator to fix a vulnerable host as quickly as possible such that the vulnerable host can be connected to the non-quarantined network 110. As previously indicated, connecting a host to the non-quarantined network 110 generally increases the usefulness and productivity of the host and of the network as a whole.

In one embodiment, the remediation engine 140 maintains credentials for a number of hosts on the quarantined network 105. The credentials allow the remediation engine 140 to access each host and execute programs on each host. In one embodiment, if the remediation engine 140 has credentials for the added host 120, the remediation engine 140 executes a remediation program on the added host 120. The remediation program is configured to direct a user of the added host 120 to resources for assisting the user to fix the vulnerabilities of the added host 120. Such resources can be located on the quarantined network 105 or at a site external to the quarantined network 105. In one embodiment, the remediation engine 140 executes a web browser on the added host 120 that is pointed to a web site or other web-accessible resource for fixing one or more of the vulnerabilities. By way of example and not limitation, a resource can be a patch management system that assists a user to install a patch on the added host 120 for fixing one or more vulnerability.

In one embodiment, if the remediation engine 140 does not have credentials for the added host 120, the remediation engine 140 uses Uniform Resource Locator ("URL") redirects in order to direct a user of the added host 120 to resources for fixing the added host 120. By using URL redirects, a user of the added host 120 will be directed to such resources upon loading a web browser.

In one embodiment, the remediation engine 140 also comprises a remediation ticketing and workflow program. In one embodiment, a ticketing and workflow program provides automated tools that direct one or more users how to fix a vulnerability in a system. The ticketing and workflow program can assign tasks to one or more users, where each task comprises a step in a process for fixing a vulnerability. Additionally, the ticketing and workflow program can allow a user to assign a task to another user, and can allow certain users, such as, for example, supervisors, to review the work of other users. In one embodiment, when the remediation module 340 informs the remediation engine 140 of the vulnerabilities of the added host 120, the remediation engine 140 can launch, in the remediation ticketing and workflow program, one or more workflows for fixing the vulnerabilities. Additional details of embodiments of ticketing and workflow programs for vulnerability remediation have been disclosed in U.S. patent application Ser. No. 10/387,358 entitled "SYSTEM AND METHOD FOR NETWORK VULNERABILITY DETECTION AND REPORTING," which was filed on Mar. 10, 2003, which was published as United States Publication No. US-2003-0217039-A1 on Nov. 20, 2003, and which is incorporated herein by reference in its entirety.

In one embodiment, the security scanner 145 is further configured to periodically generate a follow-up security assessment of a quarantined host. Furthermore, in one embodiment, the endpoint security agent 150 is further configured to receive each follow-up security assessment and to cause a switch to connect the quarantined host to a non-quarantined portion of a network if, based on at least one follow-up security assessment, the quarantined host is deemed to be a secure host. Thus, in this embodiment, a quarantined host can be connected to the non-quarantined network 110 quickly after the remediation engine 140 has succeeded in fixing the quarantined host.

For illustration only and not to limit the invention, the foregoing operations are described in relation to the added host 120. A skilled artisan will appreciate, however, in light of this disclosure, that the foregoing operations can also be performed in relation to other quarantined hosts, such as, for example, the quarantined host 125 of FIG. 1. At times, a host may remain on the quarantined network 105 for a period of time because efforts to fix its vulnerabilities have not yet succeeded. In such a case, the remediation engine 140 can periodically attempt to fix any vulnerabilities on the quarantined host 125. Additionally, the security scanner 145 can periodically scan the quarantined host 125 such that the quarantine module 315 can detect when the quarantined host 125 has become secure enough to be connected to the non-quarantined network 110. In one embodiment, when the quarantine module 315 deems the quarantined host 125 secure, the quarantine module 315 directs the switch 115 to disconnect the quarantined host 125 from the quarantined network 105 and to connect the quarantined host 125 to the non-quarantined network 110.

The way the security engine 230 on the non-quarantined network 110 maintains endpoint security on the non-quarantined network 110 is now described with reference to FIG. 2. In one embodiment, the security scanner 245 periodically scans each host, such as, for example, the tested host 220, on the non-quarantined network 110. In one embodiment, each time the security scanner 245 scans the tested host 220, the security scanner 245 generates a security assessment of the tested host 220. In one embodiment, while the security scanner 245 is a different instance of a security scanner than the security scanner 145, the security scanner 245 has the same features as the security scanner 145. Upon generating a security assessment of the tested host 220, the security scanner 245 provides the security assessment to the endpoint security agent 250. In one embodiment, a quarantine module (not shown) of the endpoint security agent 250, which is similar to the quarantine module 315 of the endpoint security agent 150 of FIGS. 1 and 3, receives the security assessment. In one embodiment, the quarantine module of the endpoint security agent 250 objectively determines, based on the security assessment, whether the tested host 220 is still secure enough to remain on the non-quarantined network 110. In one embodiment, if the quarantine module of the endpoint security agent 250 deems the tested host 220 to be a vulnerable host, the quarantine module communicates with the switch 115 and causes the switch 115 to disconnect the tested host 220 from the non-quarantined network 110 and to connect the tested host 220 to the quarantined network 105. In one embodiment, the quarantine module of the endpoint security agent 250 has substantially the same features and can perform in substantially the same way as the quarantine module 315 of the endpoint security agent 150 of FIGS. 1 and 3.

Advantageously, providing a security engine 130 on the quarantined network 105 and a security engine 230 on the non-quarantined network 110 allows hosts to move from the quarantined network 105 to the non-quarantined network 110, and vice versa, as quickly as possible. Providing quick movement of hosts between the two networks increases both the productivity and the security of the network, by ensuring (1) that vulnerable hosts are quickly barred from accessing the non-quarantined network 110 and (2) that secure hosts are quickly connected to the non-quarantined network 110.

In one embodiment, to speed the change of a host from one network to the other network, hosts are granted leases with short expiration times. Under DHCP, when a host receives a lease to an IP address, the lease has a specified expiration time. When the lease expires, the host requests a renewal of the lease. In one embodiment, a host can be changed from the quarantined network 105 to the non-quarantined network 110, or vice versa, at the time that the host renews a lease to an IP address. Thus, in order to ensure that a host can change networks as quickly as possible, in one embodiment short lease times are granted. A short lease time, as used herein, can be a lease time of one minute or less, of 5 minutes or less, of 10 minutes or less, of 15 minutes or less, of 30 minutes or less, of one hour or less, or of two hours or less. A skilled artisan will appreciate, in light of this disclosure, that for embodiments in which changes from one network to another occur upon lease renewal, the security level of a network can decrease as the lease time increases, because longer lease times can prevent a vulnerable host from being changed from the non-quarantined network 110 to the quarantined network 105 for a longer period of time.

Alternatively or additionally, embodiments can be configured to force a host to renew its lease, such as, for example, by using the force renew feature of DHCP. In these embodiments, the endpoint security system can be configured to send a host a force renew packet when the endpoint security system detects that the host must change from one network to another. For example, in a case in which the quarantine module of the security scanner 245 detects that a host on the non-quarantined network 110 has become vulnerable, the quarantine module can direct the switch 115 to disconnect the host from the non-quarantined network 110 and to connect the host to the quarantined network 105, and the endpoint security system can send a force renew to the host.

A skilled artisan will appreciate, in light of FIGS. 1 and 2, that in one preferred embodiment, the endpoint security agent 150 and the endpoint security agent 250 reside on hosts that are different from the added host 120, other quarantined hosts 125, the tested host 220, and other non-quarantined hosts 225. Similarly, a skilled artisan will appreciate that in one preferred embodiment, the remediation engine 140 resides on a host or hosts that are different from the added host 120 and other quarantined hosts 125. The architectures of the foregoing preferred embodiments can have many advantageous features, including but not limited to, the following. Preferred embodiments can be configured to target a number of target hosts, such as, for example, the added host 120, other quarantined hosts 125, the tested host 220, and other non-quarantined hosts 225, across a wide range of operating systems such as, for example, Windows variants, Mac OS variants, Unix variants, Linux variants, OS/2 variants, and the like. Similarly, in preferred embodiments, little or no change in configuration needs to occur within the target hosts in order to enable the endpoint security system to function. Furthermore, preferred embodiments can be configured such that no agent or other executable code, such as, for example, the endpoint security agent 150, needs to reside on the target hosts. Advantageously, this eliminates or reduces the time or resources needed to install or maintain an endpoint security system. Preferred embodiments can operate in place of, or in addition to, endpoint security systems that do require agents to be installed on each host, without requiring changes to other endpoint security systems. Additionally, preferred embodiments make it easier to perform more complete and detailed tests of target hosts because complex executable code does not need to be installed on every target host.

While in preferred embodiments the endpoint security agent 150, the endpoint security agent 250, and the remediation engine 140 reside in different hosts from the target hosts, this is not a required architecture of the invention. Furthermore, the foregoing advantages of such an architecture are not a necessary part of the invention. Certain embodiments depart from the foregoing preferred embodiments and have only some of the foregoing advantages, or none of them, while still having inventive features and advantages. For example, in one alternative embodiment, the endpoint security agent 150, the endpoint security agent 250, or the remediation engine 140, any two of the foregoing, or all of the foregoing, can reside in whole or in part on at least one target host, in more than one target host, or in all target hosts. Alternatively, a portion of the endpoint security agent 150, the endpoint security agent 250, or the remediation engine 140, any two of the foregoing, or all of the foregoing, can reside in part in hosts that are different from the target hosts, while other portions of the endpoint security agent 150, the endpoint security agent 250, or the remediation engine 140 reside in one or more of the target hosts. A portion of the endpoint security agent 150, the endpoint security agent 250, or the remediation engine 140 that resides in one or more target hosts can be, for example, an operating system specific module that interacts with more general operating system agnostic modules that reside outside the target hosts. A skilled artisan will appreciate, in light of this disclosure, that many variations in architecture exist that are within the scope of the invention.

Figure 4:
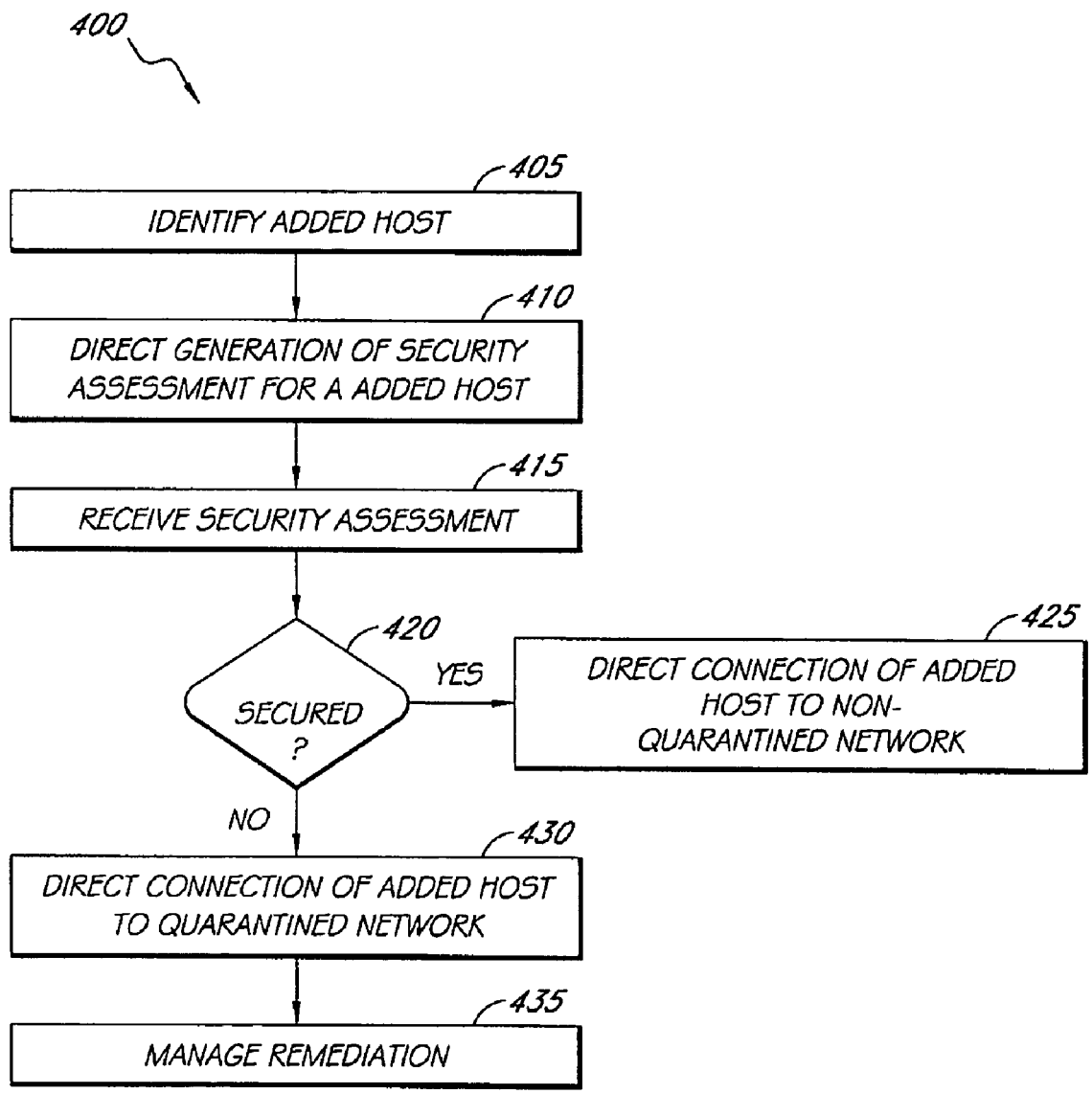
FIG. 4 is a flowchart that illustrates one embodiment of a process for providing endpoint security.

FIG. 4 is a flowchart that illustrates one embodiment of a process for providing endpoint security. In one embodiment, the endpoint security system of FIG. 1 performs a process 400 for providing endpoint security. In one embodiment, in a block 405, the process 400 identifies a host that has been added to a computer network. In one embodiment, the host detection module 310 of the endpoint security agent 150 identifies an added host by detecting at least one network address from network traffic. Alternatively or additionally, an added host can be identified manually by a computer user with or without the assistance of one or more automated processes.

In one embodiment, the process 400 proceeds to direct the generation of a security assessment of the added host in a block 410. In one embodiment, the security scan module 345 directs the security scanner 145 to generate the security assessment. In one embodiment, the security assessment comprises an indication of any vulnerabilities possessed by the added host. Alternatively or additionally, the security assessment comprises a security score that indicates a security level of the identified host. The score can be expressed as a numeric score, an alphabetic score, an alphanumeric score, or can be expressed according to any other scoring system known to a skilled artisan in light of this disclosure.

In one embodiment, a security assessment of the added host is received in a block 415. In one embodiment, the security scan module 345 receives the security assessment from the security scanner 145.

In one embodiment, in a block 420, the process 400 determines whether the added host is secure or vulnerable based on the security assessment. In one embodiment, the quarantine module 315 makes this determination according to objective criteria that indicate, based on the security assessment, whether the added host is deemed to be a secure or a vulnerable host. In an embodiment in which the security assessment comprises a numeric security score, for example, the quarantine module 315 may deem the added host to be secure if the host's security score is at or above a certain threshold and deem the added host to be vulnerable if the host's security score is below the threshold. Other ways in which the quarantine module 315 can make this determination are previously identified in relation to the foregoing description of the embodiments of FIG. 3. Still other ways will be appreciated by a skilled artisan in light of this disclosure, and the invention is not limited to the disclosed embodiments.

In one embodiment, if, in the decision block 420, the process 400 determines that the added host is a secure host, the process 400 proceeds to a block 425 and directs the connection of the added host to a non-quarantined network. In one embodiment, the quarantine module 315 performs this function by communicating with the switch 115 and directing the switch 115 to connect the added host to the non-quarantined network 110.

In one embodiment, if, in the decision block 420, the process 400 determines that the added host is not a secure host but a vulnerable host, the process 400 proceeds to a block 430 and directs the connection of the added host to a quarantined network. In one embodiment, the quarantine module 315 performs this function by communicating with the switch 115 and directing the switch 115 to connect the added host to the quarantined network 105. A skilled artisan will appreciate in light of this disclosure, that in embodiments in which the added host 120 is automatically connected to the quarantined network 105 upon being connected to the network, the process 400 can omit the block 430 entirely. Alternatively, directing the connection of the added host added host 120 to the quarantined network quarantined network 105 can, in one embodiment, comprise determining that the added host 120 is already connected to the quarantined network 105 and taking no further action.

In one embodiment, in a block 435, the process 400 manages remediation of an added host that has been connected to a quarantined network. In one embodiment, the remediation module 340 performs this function by communicating with a remediation engine 140 and directing the remediation engine 140 to commence remediation. Many features of embodiments of the remediation engine 140 are described above with reference to FIG. 3.

In one embodiment, the endpoint security agent 150 periodically receives follow-up security assessments of a host that has been connected to the quarantined portion of a computer network. In this embodiment, the endpoint security agent 150 can direct connection of a quarantined host to the non-quarantined portion of a network if, based on at least one follow-up security assessment, the quarantined host is deemed to be a secure host. In this way, a quarantined host can be connected to the non-quarantined network 110 quickly after the remediation engine 140 has succeeded in fixing the quarantined host.

Advantageously, operation of the foregoing process 400 increases network security by helping to ensure that added hosts are not connected to the non-quarantined network 110 until they have been deemed to be secure hosts.

Figure 5:
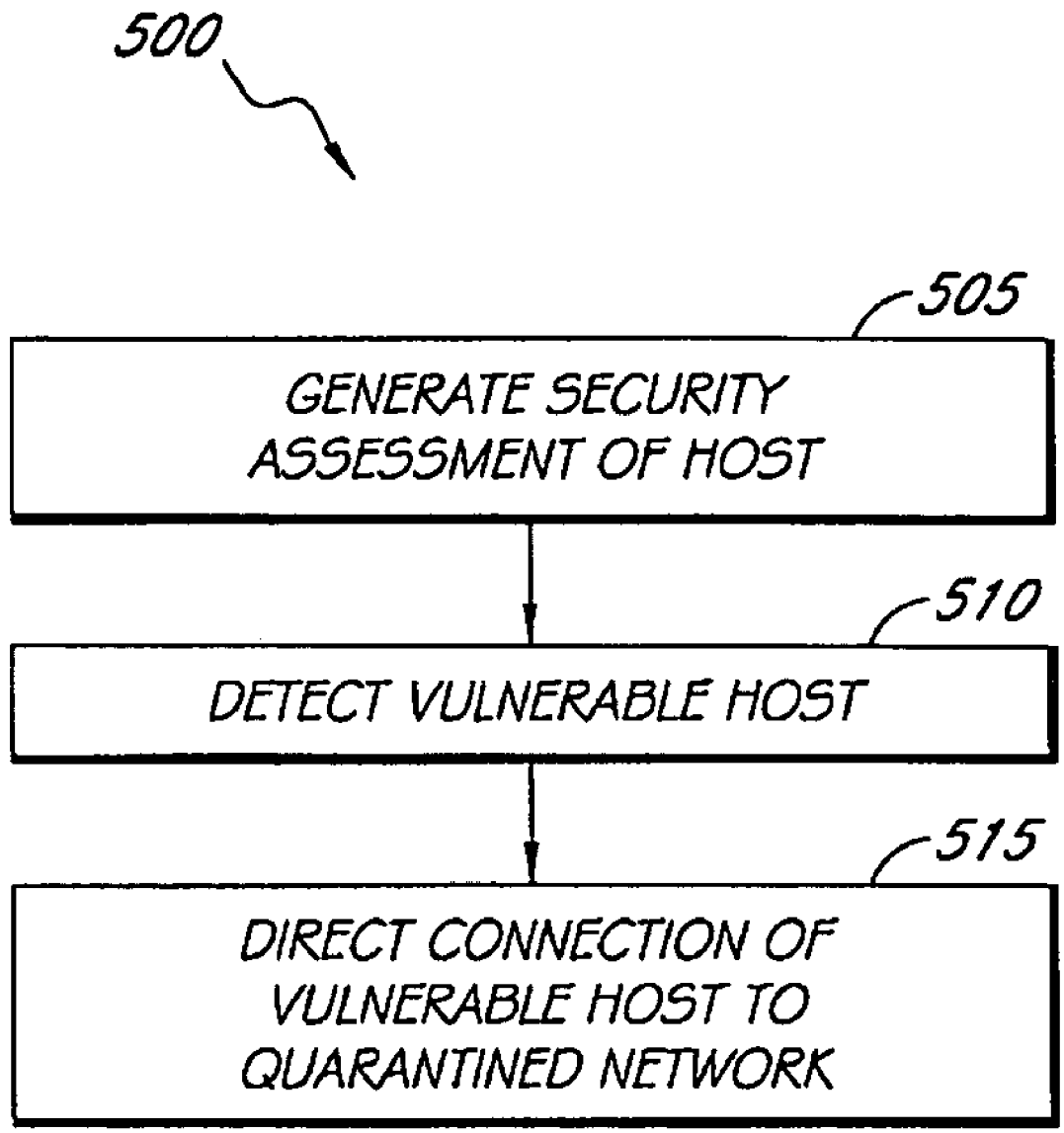
FIG. 5 is a flowchart that illustrates another embodiment of a process for providing endpoint security.

FIG. 5 is a flowchart illustrating one embodiment of a process for providing endpoint security. In one embodiment, a process 500 for providing endpoint security is performed by the endpoint security system of FIG. 2. In one embodiment, in a block 505, the process 500 generates a security assessment of a host. In one embodiment, the security scanner 245 performs this function. In one embodiment, the block 505 is performed periodically, such as, for example, every week, every day, every hour, or the like. A skilled artisan will appreciate, in light of this disclosure, that any time period can be chosen. In one embodiment, the block 505 is performed in response to a user request.

In one embodiment, the process 500 proceeds in a block 510 to detect a vulnerable host. In one embodiment, a quarantine module, such as the quarantine module (not shown) of the endpoint security agent 250, determines whether a host is vulnerable by comparing the security assessment generated by the security scanner 245 with objective criteria for determining whether a host is vulnerable. Various methods for making this determination are described above, and all such methods and any others appreciated by a skilled artisan in light of this disclosure, can be used to perform the function of the block 510.

In one embodiment, in a block 515, the process 500 proceeds directs the connection of the vulnerable host to a quarantined network. In one embodiment, the quarantine module (not shown) of the endpoint security agent 250, performs this function by communicating with the switch 115 and directing the switch 115 to connect the vulnerable host to the quarantined network 105.

Advantageously, operation of the foregoing process 500 helps to ensure that vulnerable hosts are detected, removed from the non-quarantined network 110, and connected to the quarantined network 105, as quickly as possible.

While several preferred embodiments of the various modules, hosts, devices, and other components that constitute embodiments of an endpoint security system and methods of providing endpoint security are described herein, a skilled artisan will appreciate that additional network security system and method embodiments are apparent in light of this disclosure. Furthermore, a skilled artisan will appreciate, in light of this disclosure, how to implement these alternative embodiments without departing from the principles of the invention. For example, while certain features or components that are considered to be part of preferred embodiments are described herein, many of those features or components can be omitted from certain embodiments. A skilled artisan will appreciate that such alternative embodiments that omit certain features or components will nevertheless be advantageous and useful. The claims alone define the scope of the invention and are not limited to cover only the preferred embodiments disclosed herein.

What is claimed is:

1. An endpoint security system configured to reside on a quarantined virtual local area network and to manage the connection of a host to either the quarantined virtual local area network or to a non-quarantined virtual area network based on a security assessment of the added host, the endpoint security system comprising:
   a security scanner configured to perform a security assessment on the host;
   a dynamic host configuration protocol server configured to assign Internet Protocol addresses to hosts added to the quarantined virtual local area network; and
   an endpoint security agent configured to:
      extract, from at least one packet sent by the dynamic host configuration protocol server, an Internet Protocol address that has been assigned to a host added to the quarantined virtual local area network;
      forward the extracted Internet Protocol address to the security scanner and cause the security scanner to perform a security assessment on the added host by scanning the added host, wherein the security scanner is located on a security engine on which the endpoint security agent is located;
      receive the security assessment; and
      cause a switch to connect the added host to the non-quarantined virtual local area network if, based on the security assessment of the added host, the added host is deemed to be a secure host.

2. The endpoint security system of claim 1, wherein the security assessment is performed based, at least in part, on whether the host is vulnerable to a number of known viruses and on which ports of the host are open.

3. The endpoint security system of claim 2, wherein the system is operable such that a remediation engine is configured to help fix at least one vulnerability of the vulnerable host by accessing the vulnerable host and executing an application that points a user to at least one resource for fixing the at least one vulnerability.

4. The endpoint security system of claim 3, wherein the application includes a web browser.

5. The endpoint security system of claim 3, wherein the at least one resource includes a patch management system.

6. The endpoint security system of claim 3, wherein the remediation engine is configured to help fix the at least one vulnerability of the vulnerable host by causing a web browser launched by the user on the vulnerable host to be redirected to the at least one resource for fixing the at least one vulnerability.

7. The endpoint security system of claim 3, wherein the remediation engine manages all remedial measures without receiving direction from the security engine.

8. The endpoint security system of claim 1, wherein the security scanner is further configured to periodically generate a follow-up security assessment of a quarantined host and wherein the endpoint security agent is further configured to receive each follow-up security assessment and to cause the switch to connect the quarantined host to a non-quarantined virtual local area network if, based on at least one follow-up security assessment, the quarantined host is deemed to be a secure host.

9. The endpoint security system of claim 1, further comprising causing the switch to direct a connection of the host to the quarantined virtual local area network if, based on at least a portion of the security assessment, the host is deemed to be a vulnerable host.

10. The endpoint security system of claim 9, wherein causing the switch to direct the connection of the host to the quarantined virtual local area network includes leaving the host connected to the quarantined virtual local area network if the host is already connected to the quarantined virtual local area network.

11. The endpoint security system of claim 1, wherein a remediation of at least one vulnerability of the host is managed.

12. A method, comprising:
performing, by a security scanner, a security assessment on a host; and
assigning, by a dynamic host configuration protocol server, Internet Protocol addresses to hosts added to a quarantined virtual local area network;
extracting, by an endpoint security agent, from at least one, packet sent by the dynamic host configuration protocol server, an Internet Protocol address that has been assigned to a host added to the quarantined virtual local area network;
forwarding, by the endpoint security agent, the extracted Internet Protocol address to the security scanner and cause the security scanner to perform a security assessment on the added host by scanning the added host, wherein the security scanner is located on a security engine on which the endpoint security agent is located;
receiving, by the endpoint security agent, the security assessment; and
causing, by the endpoint security agent, a switch to connect the added host to a non-quarantined virtual local area network if, based on the security assessment of the added host, the added host is deemed to be a secure host.

13. The method of claim 12, wherein the security assessment is performed based, at least in part, on whether the host is vulnerable to a number of known viruses and on which ports of the host are open.

14. The method of claim 12, wherein the security scanner is further configured to periodically generate a follow-up security assessment of a quarantined host and wherein the endpoint security agent is further configured to receive each follow-up security assessment and to cause the switch to connect the quarantined host to a non-quarantined virtual local area network if, based on at least one follow-up security assessment, the quarantined host is deemed to be a secure host.

15. The method of claim 12, wherein a remediation engine is configured to help fix at least one vulnerability of the vulnerable host by accessing the vulnerable host and executing an application that points a user to at least one resource for fixing the at least one vulnerability.

16. The method of claim 15, wherein the application includes a web browser.

17. The method of claim 15, wherein the at least one resource includes a patch management system.

18. The method of claim 15, wherein the remediation engine is configured to help fix the at least one vulnerability of the vulnerable host by causing a web browser launched by the user on the vulnerable host to be redirected to the at least one resource for fixing the at least one vulnerability.

19. The method of claim 15, wherein the remediation engine manages all remedial measures without receiving direction from the security engine.

20. The method of claim 12, further comprising directing a connection of the host to the quarantined virtual local area network if, based on at least a portion of the security assessment, the host is deemed to be a vulnerable host.

21. The method of claim 12, wherein the directing of the connection of the host to the quarantined virtual local area network includes leaving the host connected to the quarantined virtual local area network if the host is already connected to the quarantined virtual local area network.

22. The method of claim 12, wherein a remediation of at least one vulnerability of the host is managed.

* * * * *